US005517729A

United States Patent [19]
Shaffer

[11] Patent Number: 5,517,729
[45] Date of Patent: May 21, 1996

[54] REUSABLE CLOSURE DEVICE

[76] Inventor: Roy E. Shaffer, P.O. Box 4158, Louisville, Ky. 40204

[21] Appl. No.: 289,132

[22] Filed: Aug. 11, 1994

[51] Int. Cl.⁶ ............................. B65B 67/06; F16G 11/04
[52] U.S. Cl. ......................... 24/30.5 R; 24/129 R; 24/115 R; 24/131 C
[58] Field of Search ............... 24/30.5 R, 30.5 S, 24/122.6, 129 R, 130, 115 H, 115 K, 115 R, 129 A, 130, 131 C, 18, 713.2, 128

[56] References Cited

U.S. PATENT DOCUMENTS

| | | | |
|---|---|---|---|
| 200,665 | 2/1878 | Ottinger | 24/129 D |
| 307,806 | 11/1884 | Sailer | 24/129 A |
| 992,821 | 5/1911 | Stewart | 24/129 A |
| 2,449,235 | 3/1945 | Krupp | 24/130 |
| 2,733,527 | 1/1953 | Flood | 40/20 |
| 3,251,571 | 5/1966 | Ernest | 24/115 H |
| 3,397,026 | 8/1968 | Spina | 24/155 H X |
| 3,952,377 | 4/1976 | Morell | 24/136 R |
| 4,290,173 | 9/1981 | Herlau | 24/118 |
| 4,455,717 | 6/1984 | Gray | 24/115 R |
| 4,665,590 | 5/1987 | Udelhofen et al. | 24/115 H |
| 4,896,403 | 1/1990 | Vouros | 24/130 |
| 4,974,549 | 12/1990 | Gordon | 24/115 K X |

FOREIGN PATENT DOCUMENTS

| | | | |
|---|---|---|---|
| 2630516 | 10/1989 | France | 24/115 K |
| 2500926 | 7/1975 | Germany | 24/30.5 R |
| 308755 | 12/1989 | Japan | 24/30.5 R |

Primary Examiner—Peter M. Cuomo
Assistant Examiner—Robert J. Sandy
Attorney, Agent, or Firm—Felfe & Lynch

[57] ABSTRACT

Reusable closure for bags including a double cord loop and a cinch member which moves along the double cord with less resistance to close a bag and greater resistance to open same.

2 Claims, 1 Drawing Sheet

REUSABLE CLOSURE DEVICE

The invention relates to a reusable closure device for bags such as plastic garbage and leaf bags as well as general utility bags where repeated access to the contents is desired.

SUMMARY OF THE INVENTION

The present invention provides a reusable closure device for bags and the like and includes a double cord forming a loop for encircling a bag opening and a cinch member having a tapered central bore through which the double cord passes in parallel relationship. The central bore tapers inward in the direction of the loop and is provided with means to frictionally engage the parallel double cord. The engaging means provides less resistance when the cinch member is moved along the parallel double cord to make the loop smaller to close the bag opening and greater resistance when the cinch is moved along the parallel double cord to make the loop larger for removal from a bag opening to gain access to the bag contents.

In a preferred embodiment, the cinch member includes at least one handle member for gripping the cinch member while moving same along the double cord. In a further preferred embodiment the central bore includes screw threads biased away from the double cord loop.

Figure 1:
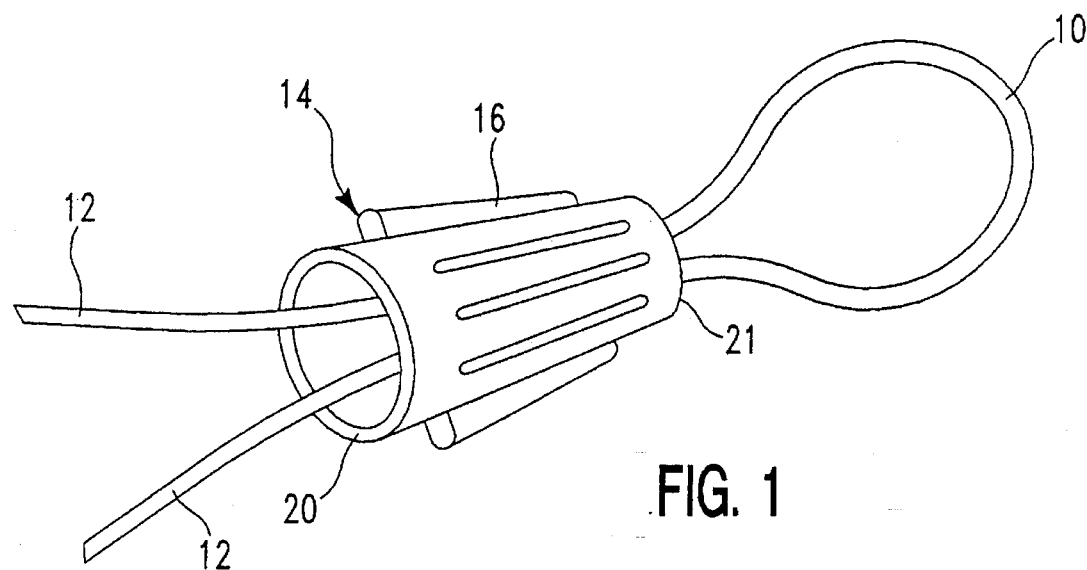
FIG. 1 is a prospective view of the reusable closure device of the invention.
Figures 2, 3, 4:
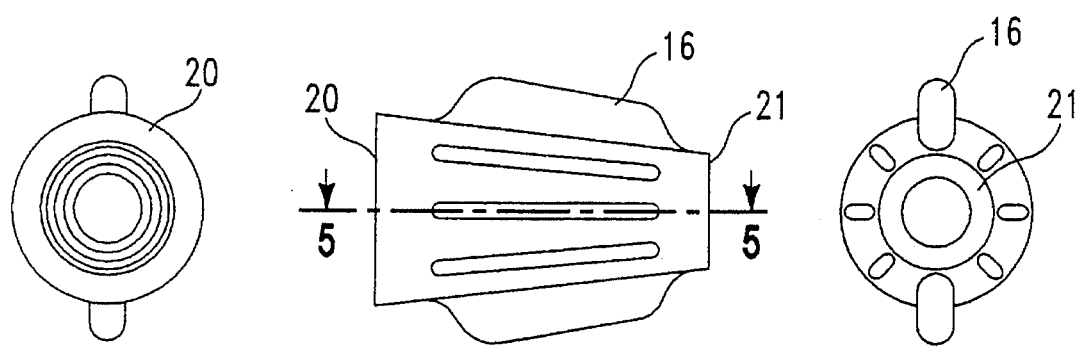
FIGS. 2, 3 and 4 are end side and end views respectively of the reusale closure device of the invention.
Figure 5:
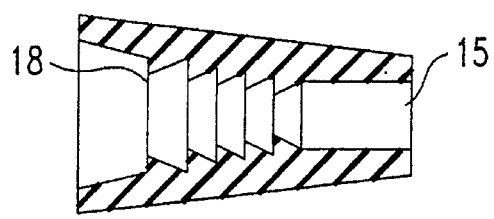
FIG. 5 is a cross sectional view of the device of FIG. 3.

Referring now to the drawing, and in particular to FIGS. 1, 3 and 5, the reusable closure device includes a double cord forming loop 10 with generally parallel end members 12. The loop 10 is adapted to encircle a bag opening and is made smaller by cinch member 14 which in a preferred embodiment has handle members 16 to facilitate movement of the cinch member 14 along the parallel cord members 12. The cinch member 16 has a central bore 15 which tapers downwards from end 21 of member 14 towards end 20 and loop 10. See FIGS. 2 and 4.

DETAILED DESCRIPTION OF THE PREFERRED EMBODIMENT

The central bore 15 in a preferred embodiment has teeth means such as screw threads 18 and 24 which are slightly biased towards end 22 and away from end 20 and loop 10. This arrangement provides less resistance when cinch member 14 is moved along parallel double cord 12 to make loop 10 smaller and close a bag opening and greater resistance when the cinch member 14 is moved along parallel cord member 12 to make loop 10 larger for removal from a bag opening and access to the bag contents.

The double looped cord can be of any known cord material such as hemp, flax, linen, nylon, polypropylene and the like and can be braided, woven and the like from these materials.

The cinch member 14 can be made of thermoset or thermoplastic polymers such as high density polyethylene, nylon and the like. Member 14 can be molded integrally with the friction means such as screw threads 18 and 24 or a separate metal or plastic insert can be provided centrally of bore 15 to present screw threads 18 and 24 for selected frictional engagement with the parallel cord members 12.

The reusable closure device of the invention can be used as a tie device for all manner of plastic or paper or cloth bags of any size such as for trash, garbage, grass cuttings, leaves and the like.

The various features of novelty which characterize the invention are pointed out with particularity in the claims annexed to and forming a part of this specification. For a better understanding of the invention, its operating advantages and specific objects obtained by its use, reference should be made to the accompanying drawings and descriptive matter in which there is illustrated and described a preferred embodiment of the invention.

What is claimed is:

1. A reusable closure device for bags and the like comprising a double cord forming a loop for encircling a bag opening and cinch means having a tapered central bore through which the double cord passes in parallel, contiguous relationship, said bore tapering downwards in the direction of said loop, the interior of said bore having screw threads biased away from said loop to surround and frictionally engage said contiguous double cord, said screw threads providing less resistance when said cinch is moved along said parallel double cord to make said loop smaller and close a bag opening and greater resistance when said cinch is moved along said parallel double cord to make said loop larger for removal from a bag opening.

2. The device of claim 1 wherein said cinch means includes at least one handle for gripping the cinch means while moving same along the double cord.

\* \* \* \* \*